United States Patent [19]

Ogiwara et al.

[11] Patent Number: 5,433,907
[45] Date of Patent: Jul. 18, 1995

[54] METHOD FOR PRODUCING FRICTION MATERIALS

[75] Inventors: Osao Ogiwara, Gunma; Takanori Konno, Saitama, both of Japan

[73] Assignees: Akebono Brake Industry Co., Ltd., Tokyo; Akebono Research And Development Centre Ltd., Saitama, Japan

[21] Appl. No.: 138,116

[22] Filed: Oct. 20, 1993

[30] Foreign Application Priority Data

Oct. 21, 1992 [JP] Japan .................... 4-283290

[51] Int. Cl.$^6$ ............................. B27N 3/02
[52] U.S. Cl. .................... 264/117; 264/109; 264/119; 264/122
[58] Field of Search ............ 264/29.1, 29.5, 117, 264/119, 137, 109, 115, 122

[56] References Cited

U.S. PATENT DOCUMENTS

| | | | |
|---|---|---|---|
| 4,297,307 | 10/1981 | Taylor | 264/29.5 |
| 4,356,137 | 10/1982 | Guzy et al. | 264/137 |
| 4,537,823 | 8/1985 | Tsang et al. | 428/308.4 |
| 4,563,386 | 1/1986 | Schwartz | 428/283 |
| 5,190,991 | 3/1993 | Parker et al. | 523/149 |
| 5,268,398 | 12/1993 | Nakagawa et al. | 523/158 |

FOREIGN PATENT DOCUMENTS

| | | |
|---|---|---|
| 0231098A3 | 8/1987 | European Pat. Off. . |
| 0415459A2 | 3/1991 | European Pat. Off. . |
| 2556432 | 6/1985 | France . |

*Primary Examiner*—Robert A. Dawson
*Assistant Examiner*—Dennis J. Chismar
*Attorney, Agent, or Firm*—Finnegan, Henderson, Farabow, Garrett & Dunner

[57] ABSTRACT

A method of producing friction materials is capable of avoiding the problems in work environment due to the coarse particulates or organic solvents while producing the friction materials. The method includes processes of mixing under dry condition raw materials consisting primarily of thermosetting resin binders, fibrous reinforcing materials and friction modifiers, adding and mixing adhesives consisting of mixture of water and alcohol with the raw mixture so that the raw materials are wet and have viscosity. Afterwards, the wet raw mixture is granulated to form a granule material, dried, and heated-and-pressed to form a final product.

13 Claims, No Drawings

METHOD FOR PRODUCING FRICTION MATERIALS

BACKGROUND OF THE INVENTION

1. Field of the Invention

The present invention relates to a method for producing friction materials to be used in brakes, clutches, and the like, for cars, railway cars and the like.

2. Description of the Related Art

General method for producing friction materials for brakes or clutches such as brake pads, brake linings, clutch facings or the like includes a dry method and wet method. The dry method has processes of uniformly mixing a thermosetting resin binder such as phenolic resin, etc., fibrous reinforcing material such as glass fibers and aramid fibers, friction modifier including rubber dust and cashew dust, and metal particles, and subsequently heating and press-forming the raw mixture material. More specifically, in the dry method the raw mixture material is preformed in a mold, and the preform is transferred to another mold where a backing plate is set, and the preform is heated and pressurized to unite with the backing plate, and then cured thereafter. The wet method, on the other hand, includes processes of mixing and wetting particles of all raw materials with solvent, drying the wet mixture of raw materials, and heating-and-press forming the material.

These dry and wet methods suffer from problems in work environment. That is, coarse particulates are generated during the production of the friction material in the dry method, and the wet method has been utilizing organic solvent which is not good for human health such as toluene, acetone, methyl ethyl ketone or the like. Further, the dry method has a difficulty in producing friction materials having a stable characteristics because some components of the fibrous reinforcing materials or the friction modifier materials or the like may cause the dispersion defect during the mixture of the raw materials. In case of the wet method, on the other hand, the resin materials and the like are completely dissolved with the solvent in the mixture of raw materials and the wettability with the other materials is good so that the density and strength of the materials are improved. However, since the amount of blow holes decreases the damping characteristic which is required as a friction material is lowered and, as a result, the frictionability of the material by the wet method Would be worse than that by the dry method.

In order to avoid the afore-mentioned difficulties it has been proposed another wet method utilizing water or latex as a wet agent which do not dissolve resin materials or the like. Even by this method, however, it is difficult to prevent the undesirable coarse particulates from occurring because the granules may move while drying or granulating the materials or may be broken due to vibration. This is because that the viscosity force of the granulated material is low in this method even the wet raw mixture is previously granulated and dried for avoiding the coarse particulates during the drying process.

SUMMARY OF THE INVENTION

The present invention was made in view of the foregoing difficulties accompanying the conventional methods. Accordingly, an object of the invention is to provide a method of producing friction materials capable of avoiding the problems in work environment due to the coarse particulates or organic solvents while producing the friction materials. It is another object of the invention to provide a wet method of producing friction materials capable of preventing granulated materials from being broken during the granulation or drying treatment while maintaining advantages of the conventional wet method by improving the viscosity strength of granulated materials.

The above and other objects of the invention can be accomplished by a provision of a method of producing friction materials which, according to the present invention, includes processes of mixing under dry condition raw materials consisting primarily of thermosetting resin binders, fibrous reinforcing materials and friction modifiers, adding and mixing adhesives consisting of mixture of water and alcohol with the raw mixture so that the raw materials are wet and have viscosity. Afterwards, the wet raw mixture is granulated to form a granule material, dried, and heated-and-pressed to form a final product.

DESCRIPTION OF THE PREFERRED EMBODIMENTS

The method of producing the friction material according to the present invention will now be described in the order of steps.

[Mixing process of raw materials]

This process includes agitating, under dry condition, particles of normally several tenth of raw materials which are utilized for general friction materials such as thermosetting resin binder, fibrous reinforcing materials and friction modifiers to be mixed with one another, and adding and mixing mixed solvent consisting of water and alcohol as adhesives with the material.

The alcohol employed as the adhesives contains methyl alcohol, ethyl alcohol, propyl alcohol, isopropyl alcohol, butyl alcohol, isobutyl alcohol and the like. In these alcohols, ethyl alcohol is the most desirable because of safety in view of work environment. Further, other than the monatomic alcohols mentioned above, polyatomic alcohol such as ethylene glycol and diethylene glycol may also be utilized although there would exist a problem in dryability. The methyl alcohol is conventionally used as a sole that would cause a problem in work environment. In contrast, the present invention would not suffer from such a problem since it is mixed with water.

The mixing ratio of water and alcohol in the solvent composing the adhesives is related to solubility of the resin with respect to alcohol utilized and, accordingly, varies in accordance with kinds of the alcohol and the resin. Generally, the mixing ratio is preferably selected within a range of 6 to 20 mol of water and 1 mol of alcohol.

On the other hand, the amount of the adhesives to be added is desirably 8 to 20 weight % of all raw materials composing the friction material. In case where the amount of the adhesives is less than 8 weight %, it is difficult to wet the mixture of raw materials sufficiently and also to apply a sufficient viscosity thereto. In this case, undesirable coarse particulates would be generated during the granulation and drying treatment. On the other hand, in case where the amount of the adhesives is larger than 20 weight %, the wet material is hardly dried.

The raw materials themselves used for the present invention are the same as those in the conventional method. That is, the thermosetting resin binder may be a thermosetting resin soluble with alcohol such as phenolic resin base or melanic resin base or their modification. Further, a part of the binder may be replaced with latex such as rubber series. In this case, water contained in the latex is necessarily applied as water for the adhesives.

The fibrous reinforcing material may be, for example, inorganic fiber composed of steel, brass, aramid, carbon, glass, potassium titanate, rock fiber, ceramic and the like, or organic fiber.

The friction modifier may be, for example, frictional dust such as rubber dust or cashew dust, or calcium carbonate, barium sulfate, magnesium oxide, graphite, molybdenum disulfide, ceramic, copper particles, brass particles, zinc particles, aluminum particles, foamed vermiculite or the like.

The amount of each of the raw materials is specified as same as the conventional method.

By the mixing process as described above, the raw mixture is wetted while viscosity is applied thereto, so that the granulated material is sufficiently prevented from being broken during granulating and drying treatments. In order to more completely prevent the granulated material from being broken, adhesives promoter as well as the adhesives may be added to improve the viscosity of the wet raw mixture and the viscosity strength of the granulated material. The adhesives promoter may preferably be a water soluble polymer material such as a polyvinyl alcohol, polyethylene oxide or their mixture. The adhesives promoter may previously added to and mixed with the adhesives or alternatively added to or mixed to the raw mixture. In case of employing the adhesives promoter, it is preferable that amount of the adhesives promoter is about 3 weight % of the raw mixture. The lower the amount of the adhesives promoter the higher the friction characteristics is.

[Granulation process and granulated material drying process]

Next, the wet raw mixture to which viscosity is applied is granulated to form a granulated material and then dried.

There are several ways for the granulating methods, i.e., a tumbling granulation method, an extruding granulation method, a disintegration granulation method, a fluidized bed granulation method, a tabletting granulation method or the like, to obtain spherical, cylindrical, or prismatic granulated materials. In these methods, the extruding granulation method is the most desirable in view of the uniform mixiability, quantity productivity and yield rate of granulated material of each of the raw materials for the friction material. Normally, substantially cylindrical granulated material of 1.5 to 7 mm diameter and 2 to 15 mm long can be formed.

After forming the granulated material, it is dried until water and alcohol composing the solvent mixture are completely evaporated. The temperature for the drying treatment is normally from the room temperature to 110° C.

[Granulated material forming process]

The granulated material dried in the foregoing process is then heated-and-press formed by the normal ways. That is, the dried granulated material is put in a mold in which is a backing plate is set, and then subjected to heat-and-press treatment to form a unit of the friction material and the backing plate. By curing the unit thereafter, a final product of the friction material can be produced. The condition for the formation is the same as the conventional methods.

EXAMPLES

Examples 1–4 and Comparative examples 1–4

Raw materials as shown in Table 1 were treated in accordance with the following processes to form a final friction materials.

In Examples 1–4 and Comparative examples 3, 4, while all the raw materials were mixed with one another under dry condition by the Irich mixer, liquid indicated in the table was added to and mixed with the mixture. After that, the wet raw mixture was granulated having particle size of 3–5 mm diameter and 4–10mm long by the Disc Pelletter (Pelletter with disc die) made by Fuji Paudal K.K. Then, after the granulated material was dried until the water contained therein becomes less than 0.5 %, the dried material was put in a mold the temperature of which was set to be 150° C. and heat-and-press formed at 400 Kg/cm$^2$. Finally, the material was further cured at 250° C. to form a final friction material.

In the Comparative Examples 1 and 2, all the raw materials were mixed with one another by the Irich mixer, after the raw mixture was preformed it was put in a mold having a temperature of 150° C. and heat-and-press formed at 400 Kg/cm$^2$, and then it was subjected to the after cure treatment at 250° C.

Further, in Examples 1–4, mixture of water-alcohol was employed as adhesives (water: 11 mol/ethyl alcohol: 1 mol). In Example 2, further, polyethylene oxide (PEO) of 1 weight % of all of the raw materials was added as adhesives promoter as well as the adhesives. In Examples 3 and 4, latex binder materials were used an amount of which was half and five ninth of the amount of the resin material employed in Examples 1 and 2, respectively.

In Comparative Example 1, the amount of resin material and friction dust (rubber dust) were relatively larger whereas in Comparative Example 2, in contrast, the amount of resin material and friction dust were relatively smaller.

In Comparative Example 3, alcohol (ethyl alcohol) was added as a wet agent and the resin and friction dust having the same amount of that of Comparative Example 1 were employed. Comparative Example 4 added water as a wet agent and the resin and friction materials of the same amount as those of Comparative Example 3, except for using NBR latex (Hiker 1551 made by Nippon Zeon Co., Ltd.: solid part is 51 weight %) which is curable by 30 weight % of sulfur and 2 weight % of curing accelerator (Noxelor EZ made by Ouchi Sinrikagaku K.K.) with respect to solid part of the latex at substantially half an amount of the resin material employed in Comparative Example 3. Hereinafter, the cured latex will be referred as a latex binder if applicable.

In Comparative Examples 3 and 4 and Examples 1–4, the liquid used therein, i.e., alcohol, water and mixture of water and alcohol was 14 weight % of all the raw materials of the friction material.

In the processes under the above conditions for the Examples and Comparative Examples, scattering of coarse particulates, granulatibity, yield rate of granulation, whether exists brake down of granulation, condition of final product were evaluated by four steps. That is,  represents "very good" or "none", ○ designates "good" or "almost none", Δ does "bad" or "a little", and x does "extremely bad" or "many". The mark of evaluation Δ and x in the granulativity mean "much coarse particulates" and "clogging", respectively. Further, those materials were also evaluated by using the Full Size Dynamometer defined by Japanese Automobile Standards Organization (JASO) test code C406-82, and result of which is also shown in Table 1.

TABLE 1

|  | Comparative Example | | | | Example | | | |
|---|---|---|---|---|---|---|---|---|
|  | 1 | 2 | 3 | 4 | 1 | 2 | 3 | 4 |
| Phenolic resin | 12 | 9 | 12 | 5 | 12 | 9 | 6 | 5 |
| Latex (solid part) | — | — | — | 4 | — | — | 6 | 4 |
| Friction dust | 15 | 5 | 15 | 5 | 15 | 5 | 15 | 5 |
| Barium sulfate | 25 | 25 | 25 | 25 | 25 | 25 | 25 | 25 |
| Copper fiber | 8 | 8 | 8 | 8 | 8 | 8 | 8 | 8 |
| Aramid fiber | 5 | 5 | 5 | 5 | 5 | 5 | 5 | 5 |
| graphite | 7 | 10 | 7 | 10 | 7 | 10 | 7 | 10 |
| Triiron tetroxide | 10 | 10 | 10 | 10 | 10 | 10 | 10 | 10 |
| Mica | — | 5 | — | 5 | — | 5 | — | 5 |
| Foamed vermiculite | 13 | — | 13 | — | 13 | — | 13 | — |
| Magnesium oxide | 2 | — | 2 | — | 2 | — | 2 | — |
| Molybdenum disulfide | 3 | — | 3 | — | 3 | — | 3 | — |
| Potassium titanate | — | 23 | — | 23 | — | 23 | — | 23 |
| Mixing method (name of liquid) | (Dry method) | | (Wet method) alcohol | latex | alcohol/ water | (Wet method) alcohol/ water + PEO | alcohol/ water + latex | alcohol/ water + PEO + latex |
| Scattering of coarse particulates | X | X | O | O | O | O | O | O |
| Granulativity | — | — | x | Δ | O | O | | |
| Whether exists brake down of granulation | — | — | | X | O | | O | |
| Performance test (friction coefficient) | x | O | O | | | | | |
| Speed at initial braking 50 km/h | O | O | Δ | O | O | O | O | O |
| Speed at initial braking 100 km/h | O | O | X | O | O | O | O | O |
| Speed at initial braking 130 km/h | O | O | X | O | O | O | O | O |
| Condition of final product | | O | X | Δ | O | O | | |

As described above, the method for producing friction material according to the present invention utilizes mixture solvent of water and alcohol as adhesives during the wet mixing process. Owing to this feature, the process of the invention exhibits an improved work environment in view of the scattering of coarse particulates and organic solvent. Further, since the viscosity strength of the granulated material is increased by the invention, the granulativity is improved while the granulated material is hardly broken. Moreover, since the materials or the friction modifier materials would not demix during the mixture of the raw materials, stable dispersion characteristics can be improved.

Furthermore, the process of the invention employs the adhesives considering the wettability of the resin binder with respect to the raw material. Accordingly, the formability can also be improved while the frictional characteristics accompanying the conventional wet method can be maintained to the same level of the dry method.

What is claimed is:

1. A method for producing a friction material, comprising steps of:
   mixing raw materials under dry condition, said raw materials comprising thermosetting resin binder, fibrous reinforcing material and friction modifier;
   adding an adhesive comprising a mixture of water and alcohol to said raw mixture and mixing therewith to form a wet raw mixture, whereby wetting said raw mixture and applying a viscosity to said raw mixture;
   granulating said wet raw mixture to form a granulated mixture;
   drying said granulated mixture; and
   heating-and-pressing said dried granulated mixture.

2. The method of claim 1, wherein said adhesive is a mixed solvent comprising 6 to 20 mol of water and 1 mol of alcohol.

3. The method of claim 1, wherein an amount of said adhesive added to said raw mixture is 8 to 20 weight % of said raw materials composing the friction material.

4. The method of claim 1, further comprising a step of adding an adhesive promoter.

5. The method of claim 4, wherein said adhesive promoter comprises a water soluble polymer material.

6. The method of claim 5, wherein said water soluble polymer material is a polyvinyl alcohol.

7. The method of claim 5, wherein said water soluble polymer material is polyethylene oxide.

8. The method of claim 5, wherein said water soluble polymer material is a mixture of a polyvinyl alcohol and a polyethylene oxide.

9. The method of claim 4, wherein said adhesive promoter is previously added to and mixed with said adhesive.

10. The method of claim 4, wherein said adhesive promoter is mixed with said raw mixture before wetting said raw mixture.

11. The method of claim 1, wherein said adhesive comprises an ethyl alcohol.

12. The method of claim 1, wherein said granulating step comprises an extruding granulation method.

13. The method of claim 12, wherein said granulated material is substantially cylindrical having 1.5 to 7 mm diameter and 2 to 15 mm long.

* * * * *